United States Patent
Lechner et al.

(10) Patent No.: US 12,025,199 B2
(45) Date of Patent: Jul. 2, 2024

(54) CABLE GLAND

(71) Applicant: PFLITSCH GMBH & CO. KG, Hückeswagen (DE)

(72) Inventors: Martin Lechner, Lindlar (DE); Robert Von Otte, Schalksmühle (DE)

(73) Assignee: PFLITSCH GMBH & CO. KG, Hückeswagen (DE)

( * ) Notice: Subject to any disclaimer, the term of this patent is extended or adjusted under 35 U.S.C. 154(b) by 0 days.

(21) Appl. No.: 18/394,125

(22) Filed: Dec. 22, 2023

(65) Prior Publication Data

US 2024/0125368 A1    Apr. 18, 2024

Related U.S. Application Data

(63) Continuation of application No. PCT/EP2022/067221, filed on Jun. 23, 2022.

(51) Int. Cl.
| | |
|---|---|
| *F16F 1/04* | (2006.01) |
| *H01R 13/24* | (2006.01) |
| *H02G 3/06* | (2006.01) |
| *H02G 15/068* | (2006.01) |

(52) U.S. Cl.
CPC ......... *F16F 1/045* (2013.01); *H01R 13/2421* (2013.01); *H02G 3/0625* (2013.01); *H02G 15/068* (2013.01)

(58) Field of Classification Search
CPC ............... H02G 15/068; H02G 3/0625; H01R 13/2421; F16F 1/045
See application file for complete search history.

(56) References Cited

U.S. PATENT DOCUMENTS

| | | | |
|---|---|---|---|
| 8,529,303 B2 | 9/2013 | Zhang | |
| 9,293,849 B2 | 3/2016 | Balsells et al. | |
| 9,312,630 B2* | 4/2016 | Huang | H01R 13/62 |
| 10,598,241 B2 | 3/2020 | Poon et al. | |
| 10,714,922 B2* | 7/2020 | Platt | H02G 3/22 |
| 2004/0070128 A1* | 4/2004 | Balsells | F16F 1/045 |
| | | | 267/180 |
| 2011/0062640 A1 | 3/2011 | Leon | |
| 2012/0295471 A1 | 11/2012 | Leon | |
| 2016/0204557 A1 | 7/2016 | Kim | |
| 2017/0056956 A1 | 3/2017 | Balsells et al. | |
| 2018/0278005 A1 | 9/2018 | Wang | |
| 2020/0393064 A1 | 12/2020 | Lechner | |

(Continued)

FOREIGN PATENT DOCUMENTS

| | | |
|---|---|---|
| CN | 204651864 U | 9/2015 |
| CN | 204651870 U | 9/2015 |

(Continued)

OTHER PUBLICATIONS

International Search Report issued in corresponding International Application PCT/EP2022/067221, dated Oct. 21, 2022.

*Primary Examiner* — Hoa C Nguyen
*Assistant Examiner* — Amol H Patel
(74) *Attorney, Agent, or Firm* — Burris Law, PLLC

(57) ABSTRACT

A contact element for contacting at least one long molded part, in particular a cable, in the unassembled state includes a plurality of first windings and a plurality of second windings which are geometrically different from the first windings, and a through-opening for the passage of a long molded part.

14 Claims, 13 Drawing Sheets

(56) References Cited

U.S. PATENT DOCUMENTS

2022/0399709 A1* 12/2022 Pawar .................... H02G 15/04
2023/0344153 A1* 10/2023 Buchanan .............. H01R 13/17

FOREIGN PATENT DOCUMENTS

| CN | 204858500 U | 12/2015 |
| DE | 102008018205 A1 | 12/2009 |
| DE | 102013109424 A1 | 3/2015 |
| DE | 102008018205 B4 | 12/2015 |

* cited by examiner

CABLE GLAND

CROSS-REFERENCE TO RELATED APPLICATIONS

This application is a continuation of International Application No. PCT/EP2022/067221, filed on Jun. 23, 2022, which claims priority to and the benefit of German Application No. 102021116200.9, filed on Jun. 23, 2021. The disclosures of the above applications are incorporated herein by reference.

FIELD

The present disclosure relates to a cable gland with at least one contact element.

BACKGROUND

The statements in this section merely provide background information related to the present disclosure and may not constitute prior art.

Contact elements for ensuring electromagnetic compatibility (EMC) are generally known from the prior art. For example, DE 10 2008 018 205 B4 discloses a device for the electromagnetically compatible arrangement of a cable with a contacting member comprising a wound spring element, wherein windings of the spring element have a substantially straight retaining section, which is aligned parallel to the sheath of the feed-through-opening in the installation position, and wherein the spring element is supported on a sheath or a shielding of a cable.

US 2017/056956 A1 discloses a contact element with an inclined spring. US 2011/062640 A1 discloses an inclined spring as a contact element of subminiature components. CN 204 651 864 U discloses a cable gland with a contact spring. CN 204 651 870 U discloses a cable gland with a contact spring. CN 204 858 500 U discloses a cable gland with a contact spring. US 2016/204557 A1 discloses a connection device for high-frequency signals.

The contact elements for cable glands known from the prior art have the disadvantage that they are designed for exactly one diameter or a very limited diameter range of a long molded part. Different contact elements with different internal diameters are therefore used for different long part diameters. As a result, a large number of cable glands must be provided for different long part diameters, which is complex and cost-intensive. Furthermore, the contact elements known from the prior art must be adapted to the respective desired electromagnetic compatibility (EMC). The contact element must be designed in such a way that the contact element can withstand currents or fault currents induced in a shield without damage.

SUMMARY

This section provides a general summary of the disclosure and is not a comprehensive disclosure of its full scope or all of its features.

The present disclosure provides an improvement to the cable glands with contact elements known from the prior art. In one form, the present disclosure provides an improvement to the usability and/or interchangeability of the contact element. The present disclosure provides a cable gland which is capable of accommodating and contacting a large number of different long molded parts with different diameters. In one form, the present disclosure provides a cable gland with a contact element which can reliably contact small diameters of long molded parts and at the same time is easy to assemble. In one variation, the present disclosure provides a cable gland with a contact element that can be inserted into a component that is easy to manufacture.

The present disclosure provides a cable gland with at least one contact element for contacting at least one long molded part, such as a cable, wherein the contact element (in the unassembled state) comprises at least a plurality of first windings and a plurality of second windings which are geometrically different from the first windings and a through-opening for a passage of a long molded part, wherein a first diameter d1 of the through-opening is defined by the first windings and a second diameter d2 of the through-opening is defined by the second windings and wherein the first diameter d1 and the second diameter d2 are different.

A cable gland with at least one contact element is proposed for contacting, shielding or attenuating electromagnetic interference and/or for ensuring electromagnetic compatibility, for example in accordance with IEC 62153-4-10: 2015+AMD1:2020 CSV, at least with a long molded part, in particular a cable, in the unassembled state. The contact element comprises several first windings and several second windings, which are geometrically different from the first windings, and a through-opening for the passage of a long molded part. A first diameter d1 of the through-opening is defined by the first windings and a second diameter d2 of the through-opening is defined by the second windings, whereby the first diameter d1 and the second diameter d2 are different.

In the sense of the present disclosure, "geometrically different" is to be understood as meaning that the shaping of the first and second windings, in particular in a view of the first and second windings respectively in the circumferential direction of the contact element, are not congruent. In particular, the projections of the first and second windings in each case onto a plane onto which a radius is arranged on the main axis of the contact element and which at least intersects the respective winding, such as at least intersects a retaining section of the winding, are not congruent.

According to the present disclosure a first diameter d1 of the through-opening is defined by the first windings and a second diameter d2 of the through-opening is defined by the second windings.

According to the present disclosure the first diameter d1 and the second diameter d2 are different.

The advantage of the differently designed windings, which define at least two different diameters of the through-openings, is on the one hand that only one contact element has to be provided for long molded parts with different diameters, and on the other hand that a larger number of contacting windings can be applied to the long molded part in the case of larger long molded part diameters, where larger current conductions are expected, or in the case of several long molded parts. A large number of identical windings, which only define one diameter for a through-opening, would inhibit reliably contacting long molded parts with different long molded part diameters. Another advantage is that even with small diameters, where in particular only a few first windings define the diameter of the through-opening, the second windings provide sufficient spring wire length and thus a larger flexible range than with solutions known from the prior art. This reduces the spring stiffness, which allows for small diameters, for example from about 2 mm to about 6 mm, to reasonably mount a long molded part in the contact element. Another advantage of the proposed contact element is that fewer parts can be kept in stock to mount different long molded parts. In the proposed contact element, only individual windings define a small diameter for long molded parts with a small long molded part diameter, while at the same time there are sufficient windings overall to also divert currents from long molded parts with a larger long molded part diameter, as the other windings then also come into contact with the long molded part.

Another advantage of the present disclosure is that only some windings, such as only the first windings, form a smaller diameter than the second windings. For small long molded part diameters, for example about 2 mm to about 6 mm, fewer windings are provided since a sum of the individual wire diameters of the windings define a circumference of the through-opening. However, the spring stiffness is much higher with a small number of windings, so that at a predetermined reduction the spring becomes too stiff for installation or insertion into a component. In order to reduce the spring stiffness, second windings are provided which do not extend to the diameter defined by the first windings. This advantageously increases the spring length and thus reduces the spring stiffness, and enables the usability and variability for different diameters of long molded parts.

The contact element, in one form, comprises a wire that forms the windings. The wire has a wire diameter. In the sense of the present disclosure, the wire diameter is to be understood as a diameter of the wire transverse to the longitudinal extension of the wire that forms the individual windings. In one form, the wire is metallic, electrically conductive and resilient.

The contact element has a through-opening. If at least one long molded part is inserted into the proposed contact element, in particular passed through the through-opening, the long molded part is contacted by the first windings and/or second windings, depending on the diameter of the long molded part or the diameter formed by a plurality of long molded parts. If the long molded part has an exposed electromagnetic shield in a contact area, an electric current can flow from the shield into the contact element or vice versa, voltage equalization can take place and the long molded part can be earthed. The safe electrical connection between the long molded part and the component, which is made possible by the contact element, provides electromagnetic compatibility.

The multiple first windings define the first diameter d1 of the through-opening in the unassembled state. The multiple second windings define the second diameter d2 of the through-opening in the unassembled state. The first diameter d1 differs from the second diameter d2 in the unassembled state. In one form, the second diameter d2 is larger than the first diameter d1 in the unassembled state. In one form, further windings can be provided, for example third windings and/or fourth windings. In one form, the further windings differ from the first windings and the second windings in the unassembled state. Further, in one form, the further windings define further diameters of the through-opening, in particular in the unassembled state.

In one form, the contact element is ring-shaped. In one variation, the ring-shaped spring is self-contained, and is formed into a ring by connecting or joining the ends. The contact element also can comprise a wound, ring-shaped closed spring made of a wire-shaped, electrically conductive material. Furthermore, one envelope end of the wire spring is substantially shaped like a torus.

The windings in the sense of the present application are defined by a starting point and an end point, which lie in a plane whose normal is a main axis through the through-opening of the contact element. In one form, the starting point and the end point have the same distance from the main axis of the contact element. Alternatively, the start point and end point can be at different distances from the main axis of the contact element. The winding extends helically between the starting point and the end point. In one form, the starting point and/or the end point is arranged in a transition from a retaining section of a winding to a supporting section or extending section of the next winding. In the sense of the present disclosure, the retaining section, extending section and/or supporting section are not considered to be subdivided by the starting point and/or end point. For example, if the contact element is cut along a circumference of the contact element in the plane of the starting point and the end point at a transition between the retaining section and the supporting section and/or the extending section, the contact element breaks down into the individual at least first and second windings.

Adjacent sections of the individual first and/or second windings, in particular a retaining section, at least one supporting section and, if desired, at least one extending section, can be distinguished from one another by a kink or a bend. For example, a retaining section adjoins another section, such as a supporting section and/or an extending section, and is connected to the other section via a bending point. The supporting section and extending section can also be connected to each other via a bending point.

In one form, a first and/or a second winding comprise at least a retaining section and a supporting section, which are directly or indirectly connected to one another, and are further connected to one another, and thus indirectly connected to one another, by an extending section. In one form, a first and a second extending section adjoin both ends of the supporting section and are directly or indirectly connected to the supporting section. In one form, a radial section is formed between the retaining section and the at least one extending section and/or between the at least one supporting section and the at least one extending section and/or the retaining section and the supporting section. As such, the at least one retaining section, the extending section and/or the supporting section are indirectly connected to each other. In one form, the radial section is as short as possible in the winding direction. Further, the radial section represents the technically desired bending radius of the bending point, which is present between the individual sections. In one form, the radial section is longer than technically desired. In one form, the radial section comprises a radius that is as small as technically desired. Alternatively, the radial section comprises a radius that is larger than technically desired. In one form, the at least one retaining section, the at least one extending section and/or the at least one supporting section are each indirectly connected to one another by radial sections.

In one form, the basic shape of the first and/or second winding, in a view of the first and/or second winding, is selected from a group comprising approximately round, ellipsoidal, triangular, quadrangular, pentagonal or polygonal, square, rectangular, trapezoidal, polygonal, semicircular and/or house-shaped. The first and/or second winding has a basic shape which is composed of several shapes or parts of several shapes, such as parts of a triangle and a rectangle, for example a house shape, or for example a rounding or a partial circle and a part of a rectangle or for example a rounding and a part of a triangle. In one form, the first winding and/or the second winding is not circular and/or not oval. In another form the plurality of first windings and the plurality of second windings is at least one of arcuate, rectilinear, semicircular, or is formed as part of a triangle with a triangular apex.

Exemplary enumerations are not to be regarded as exhaustive in the sense of the present disclosure but can be supplemented within the framework of general technical knowledge.

In one form, the first and second windings have identical, similar, or different, dissimilar, basic shapes, in a view of the first or second winding. The view of the first or second winding is a view in the direction of the circumference.

In one form, the first and/or the second winding comprise at least one retaining section. The first and/or the second windings comprise at least one retaining section for making contact with a component. In one variation, an inner wall of a component, which is part of a cable gland and is further designed as a nipple or double nipple, can be contacted by means of the retaining section.

In one form, the retaining section or a projection of the retaining section is arranged at an angle or parallel to the main axis in a plane on which the main axis is arranged. In one form, the at least one retaining section is rectilinear and further has an angle in a range from about −50° to about +50°, and in one variation about −45° to about +45°, or in another variation about −30° to about +30°, to a main axis of the contact element passing centrally through the through-opening. An envelope can be placed around the contact element. The envelope is an imaginary surface that touches each winding, such as each section of each winding of the contact element, on the outside. The envelope forms a lateral surface in the area of the retaining sections. In one form, the outer surface of the envelope ends of the contact element is substantially conical (with an angular arrangement of the retaining section as described above) or cylindrical (with a parallel arrangement of the retaining section as described above). The conical shape of the contact element, which is derived from the outer surface, has the advantage that the contact element can be easily inserted into a component that is cylindrical on the inside. The retaining section angled in this way can rest against the inner wall of the component, whereby the windings are aligned with the main axis at an angle to the radius in a top view of the contact element in the direction of the main axis.

If the term "about" is used in the context of the present disclosure in connection with values or value ranges, this is to be understood as a tolerance range which the person skilled in the art considers to be usual in this field, in particular a tolerance range of ±20%, and in one form ±10%, or in another form ±5%. Insofar as different value ranges are indicated in the present disclosure, the lower limits and the upper limits of the different value ranges can be combined with one another. In the context of the present disclosure, the term "substantially" indicates a tolerance range which is acceptable to a person skilled in the art from an economic and technical point of view, so that the corresponding feature can still be recognized or realized as such.

In one form, only the first windings or only the second windings have a retaining section that can be contacted with a component. In one form, the outer surface of the envelope ends of the contact element is substantially formed only by the first windings or only by the second windings. In a further form, the retaining section of the first windings and the retaining section of the second windings form the lateral surface of the contact element's envelope ends. In particular, the outer surface of the envelope ends of the contact element is cylindrical or conical in shape. In a further form, a retaining section of the first or second windings is arranged further outwards radially to the main axis than a retaining section of the respective other windings.

In one form, the second windings in particular are double-wound. The double-wound second windings are characterized by the fact that they have a retaining section that is arranged between two partial windings. The extension section of the second windings is, in one form, arranged closer to the main axis than the extension section of the first windings. The extending section is, in one form, divided into two parts. This design advantageously enables a section of the inner wall of a component, into which the contact element can be mounted, to be engaged between the extending section parts. For example, the component may be manufactured such that a bore has a first and a second section with a diameter suitable for abutment of the extending sections of the first turns, wherein a third section with a smaller inner diameter than the first and the second section is arranged between the first and the second section, which is designed for abutment of the extending section.

In a further variation, the first and second windings have a supporting section for contact with at least one long molded part. The supporting section can be substantially straight or rounded. In one form, the supporting section of the first windings defines the first diameter $d1$ of the through-opening. In one variation, the supporting section of the second windings defines the second diameter $d2$ of the through-opening.

In a further variation, the first and/or the second windings comprise at least one extending section, which adjoins the retaining section. In one form, the extending section is arranged between the retaining section and the supporting section. In one form, a winding has a first and a second extending section, which are arranged on both sides of the supporting section. In one form, the first extending section is substantially the same length, shorter or longer than the second extending section.

In one form, the retaining section, supporting section and, if applicable, extending section are distinguished from each other by a different shape. For example, the retaining section is shaped as a straight section of the winding, which is arranged radially on the outside of the contact element. Furthermore, the supporting section is, in one form, designed as a circular section, oval section or angularly shaped section with two legs. In one form, the supporting section is coiled and comprises, for example, two triangular, rectangular or rounded coiled sections. In one variation, the extending section runs at right angles with respect to the main axis.

In a design of the contact element in which the retaining section is arranged substantially parallel to the main axis, the individual first and/or second windings, in one form, each project two legs onto a viewing plane in a top view of the contact element in the direction of the main axis, particularly if the contact element has a cylindrical shape. The viewing plane is a plane whose normal is the main axis of the contact element. In one form, the two legs of the supporting section are projected onto the viewing plane, and at least the supporting section and the extending section, are connected to each other at a vertex. The bisector of the two legs is the alignment of the first and/or second windings. If the alignment of the first and/or second windings coincides with the radius of the contact element on the main axis or is angled by approximately ±5° from the radius on the main axis, the first and/or second windings are substantially radially aligned within the meaning of the present application. In one form, in an unassembled state of the contact element, the first and/or the second windings have a substantially radial orientation. If the angle bisector or the orientation of the first and/or second windings deviates from the radius of the contact element on the main axis by more than about ±5°, and in one form by about ±6° to about ±80°, the first and/or second winding has an orientation deviating from the radius on the main axis.

In a further variation, the first and/or second windings in an unassembled state have an orientation that deviates from the radius to the main axis by approximately ±6° to approximately ±30°, in one form approximately ±6° to approximately ±15°, and in another form approximately ±6° to ±10°. In one variation, only the first or only the second windings are angled away from the radius on the main axis. In another form, all first and/or all second windings deviate from the radius to the main axis by approximately the same angle, and in one variation in the same direction, counterclockwise or clockwise. Further, the first turns and the second turns deviate from the radius to the main axis at a different angle. In a further variation, the first windings or the second windings are radially aligned, while the other windings have an alignment that deviates from the radius on the main axis.

In one form, the first and/or second windings have a radial alignment in a state mounted in a component, in particular with a cylindrical inner wall, without a guided long molded part. In a further variation, the first and/or second windings are aligned with the main axis at an angle to the radius in a state in which they are mounted in a component, in particular with a cylindrical inner wall, without a guided long molded part.

In one form, the orientation of the first and/or second windings in an assembled state without at least one long molded part passing through the through-opening of the contact element deviates from the radius to the main axis by approximately ±6° to approximately ±50°, in one variation approximately ±6° to approximately ±30°, and in another variation approximately ±8° to ±25°. In one form, the orientation of the first and/or second windings in an assembled state with the long molded part passed through deviates approximately ±10° to approximately ±80°, in one variation approximately ±10° to approximately ±75°, and in another variation approximately ±20° to ±70°, from the radius on the main axis. By passing through the long-molded part when the contact element is mounted in a component with a cylindrical inner wall, the bending of the at least first and/or second windings, and in one form all windings, is increased compared to the mounted state in such a component without a passed-through long-molded part.

In one form, the first and/or second windings in a state mounted in a component, in particular with a cylindrical inner wall, are aligned with the main axis at an angle to the radius with at least one long molded part, which is passed through the component and through the contact element.

In one form, the first and second windings are arranged alternately in the circumferential direction of the contact element. In a further variation, one or more second windings are arranged between two first windings. For example, two or three second windings can be arranged between two first windings. In a further variation, the first and second windings are arranged individually or alternately in groups. For example, a group of two first windings can alternate with a group of two second windings.

In one form, a plurality of configurations of second windings are provided, which define the second diameter d2. In one form, the configurations of second windings differ geometrically from one another. In one variation, a second winding of each of the different configurations is arranged between first windings. For example, one first configuration of the second windings and one second configuration of the second windings and possibly one third configuration of the second windings are each arranged between first windings.

In one form, for example, the first windings are formed with at least one extending section and define the first diameter d1 of the passage opening and the second windings are substantially triangular, in a view of the second winding, and define the second diameter d2 of the passage opening, wherein the first diameter d1 is smaller than the second diameter d2. For example, the first windings are house-shaped or pentagonal. In one form, the first windings comprise two extending sections. In one variation the extending sections of the first windings are of approximately equal length. In one variation the first windings and second windings alternate in the circumferential direction. In one form, the first windings and second windings are substantially triangular, in a view of the windings, and the first windings each additionally have an extending section between the supporting section and the retaining section relative to the second windings.

In one form, the contact element comprises at least one electrically conductive material. In one variation, the contact element comprises at least one material selected from a group comprising steel, spring steel, copper, gold, brass and/or carbon and modifications thereof.

In one form, a contact element according to the present disclosure in the unassembled state has a plurality of first windings and a plurality of second windings, which are arranged alternately. The contact element is toroidal, and in one form designed as an annularly closed and coiled spring, made of a wire-shaped material. The first windings differ from the second windings in terms of their geometric design and/or their dimensions and project radially inwards towards the main axis to varying degrees. The first and second windings define a through-opening. The first and second windings have a radial alignment. The shape of the contact element is cylindrical. The through-opening comprises a first diameter d1, which is defined by the first windings. Furthermore, the through-opening comprises a second diameter, which is defined by the second windings. The first diameter d1 is, for example, smaller than the second diameter d2, or vice versa.

In a further variation of a contact element according to the present disclosure, the first and second windings have a retaining section that can be brought into contact with an inner wall of a component. The retaining section is, for example, aligned parallel to a main axis of the contact element. The contact element then has a cylindrical shape when mounted in this way. In one variation, the retaining section can also be arranged at an angle to the main axis. The contact element then has a conical shape when unassembled and a cylindrical shape when mounted in the component. Depending on the production process, the angle of the retaining element to the main axis can be designed differently in the unassembled state. In one form, the angle of the retaining element to the main axis in the unassembled state is approximately 0° to approximately 90°, in one variation approximately 1° to approximately 90°, and in another variation somewhat 20° to approximately 60°. If an angle of the retaining section to the main axis of approximately 90° is designed, in particular for production reasons, only one diameter of the through-opening is provided in the unassembled state, which is formed by the transition from the retaining section to the supporting section or extending section. Furthermore, the first and second windings each comprise a supporting section which can be brought into contact with at least one elongated part. The supporting section is, for example, designed as an angularly shaped section with two legs. The first windings can also have an extending section, which is arranged between the retaining section and the supporting section. The second windings are designed in such a way that the supporting section is directly adjacent to the retaining section.

The contact element can, in one form, be installed in a component of a cable gland to provide electromagnetic compatibility, for example in accordance with IEC 62153-4-10:2015+AMD1:2020 CSV. The contact element according to the present disclosure can be mounted in a component, in particular with a cylindrical inner wall. If an outer diameter of the contact element is smaller than or equal to an inner diameter of the component, the contact element is substantially undeformed in the assembled state. If the outer diameter of the contact element is larger than the inner diameter of the component, the contact element is radially compressed in the assembled state which can result in deformation of the first and/or second windings. If, in the assembled state, an elongated part whose elongated part diameter is at least greater than the first and/or second diameter of the contact element is passed through the component with the contact element, the first and/or second windings come into contact with the elongated part and are deformed. As such, two deformations of the contact element can be performed in the assembled state.

In one variation, the contact element can be mounted in a component with a cylindrical inner wall and an elongated part can be passed through the through-opening. The elongated part has an elongated part diameter that is larger than the first diameter d1, but smaller than the second diameter d2. The first windings are deformed by the passage of the long-molded part and by the insertion into the component and form a first assembled diameter $d1_e$, which is the same size as the long-molded part diameter. The first windings are advantageously deformed in a circumferential direction of the contact element by the feed-through of the long-molded part in such a way that an orientation of the first windings has an angle relative to the radius on the main axis of the contact element. For example, the first windings are aligned counterclockwise. The first windings, in one form, have a larger angle relative to the radius on the main axis of the contact element than before the insertion of the long molded part. In one form of an assembled contact element, the second windings are aligned in the assembled state without the long molded part having been passed through, as the long molded part does not touch them. In one form, the first windings are designed in such a way that they can move over the second windings without touching or entraining them. Radial displacement of the first windings or radial expansion of the contact element is inhibited by the component in which the contact element is mounted and on the inner wall of which the retaining sections of the contact element are supported. In particular, the first and second windings are designed in such a way that they are substantially individually deformable. In a further variation, a joint deformation of the first and second windings is possible. In one form, the first and second windings can slide over each other and do not collide when the long molded part is inserted into the through-opening. In an alternative variation, the first and second windings can touch each other when the first windings are deformed, such as in the region of an abutment against the at least one long molded part via the supporting sections thereof.

In a further variation, the contact element has triangular-shaped first windings and rectangular-shaped second windings in an unassembled state. In one variation, the first windings define a first diameter d1 of the opening and a first outer diameter $d_{A1}$ of the contact element. Furthermore, the second windings define a second diameter d2 of the opening and a second outer diameter $d_{A2}$ of the contact element. In one form, the first windings are substantially triangular in shape, with the retaining section and the supporting section forming an approximately isosceles triangle when viewed in the circumferential direction, which can also be at an obtuse angle. The supporting section, two extending sections and retaining section of the second windings form a rectangle when viewed in the circumferential direction, with the retaining section of the second windings being arranged further outwards radially to the main axis than the retaining section of the first windings.

In a further form, the contact element comprises triangularly shaped first windings and two different triangularly shaped second windings. One first configuration of the second windings and One second configuration of the second windings are each arranged between first windings. In the circumferential direction, first windings and the two different second windings are arranged one after the other, so that a first aspect of the second windings follows the first winding and a second aspect of the second windings follows the first aspect of the second winding. The first version of the second windings projects radially further outwards towards the main axis than the first windings and the second version of the second windings. This design advantageously influences the bending properties of the contact element making the supporting section softer. The retaining section of the first version of the second windings is, for example, arranged further radially outwards to the main axis than the retaining section of the second version of the second windings.

In a further variation, the contact element has first windings and two configurations of second windings. In particular, one first configuration of the second windings and one second configuration of the second windings are each arranged between first windings. The first windings have a retaining section, a first extending section, a curved supporting section, the envelope end of which can be convex inwards, and a second extending section. The first design of the second windings has a retaining section, a first extending section, a supporting section, the envelope of which can be convex inwards, and a second extending section. The second configuration of the second windings has a retaining section, a first extending section, a supporting section, the envelope of which can be convex inwards, and a second extending section, which is approximately the same length as the first extending section. The retaining section of the first windings is approximately as long as the retaining section of the first aspect of the second windings. The first extending section of the first aspect of the second windings is approximately as long as the second extending section of the second aspect of the second windings. The second extending section of the first aspect of the second windings is approximately as long as the first extending section of the second aspect of the second windings. The first extending section of the first aspect of the second windings and the second extending section of the second aspect of the second windings are longer than the second extending section of the first aspect of the second windings and the first extending section of the second aspect of the second windings. The retaining section of the first winding is adjacent to the second extending section of the preceding second aspect of the second windings, the second extending section of the first winding is adjacent to the first retaining section of the first aspect of the second windings, the second extending section of the first aspect of the second windings is adjacent to the retaining section of the second aspect of the second windings, and the second extending section of the second aspect of the second windings is adjacent to the retaining section of the subsequent first windings, and so on. The supporting section of the first winding defines a first diameter d1. The supporting sections of the first and second aspects of the second windings define a second diameter d2, which is larger than d1. The retaining section of the second aspect of the second windings is arranged closer to the main axis than the retaining section of the first windings and the retaining section of the first aspect of the second windings. The retaining section of the first windings and the retaining section of the first aspect of the second windings are at the same distance from the main axis. This form allows for a section of an inner wall of a component, into which the contact element can be mounted, to be engaged between the retaining section of the first winding and the retaining section of the first aspect of the second windings. For example, the component can be manufactured in such a way that a bore has a first and a second inner diameter which is suitable for the abutment of the retaining section of the first winding and the retaining section of the first form of the second windings, wherein the first and second inner diameters are, in one form, the same size. Advantageously, a third inner diameter is arranged between the first and second inner diameters, which is smaller than the first and second inner diameters and is designed for the retaining section of the second configuration of the second windings. The section of the inner wall of the component with the third inner diameter can thus be engaged between the retaining sections of the first windings and the retaining sections of the first configuration of the second windings.

In a further variation, the contact element can be mounted in a component with a cylindrical inner wall and a long molded part can be passed through the through-opening. The long molded part has a long molded part diameter that is larger than the first diameter d1 and larger than the second diameter d2, the first windings and the second windings are deformed or further deformed in the assembled state in the component after the long molded part has passed through and form a first assembled diameter $d1_e$ and a second assembled diameter $d2_e$, which are each the same size as the long molded part diameter. The first and second windings are deformed by the passage of the long molded part in a circumferential direction of the contact element, for example, such that the orientation of the first and second windings is at a different angle to the original orientation with respect to the radius on the main axis and are aligned counterclockwise or clockwise, for example.

In a further form of the contact element, the orientations of the first and second windings in an unassembled state are aligned at an angle, for example at an angle of approximately 25°, to the radius on the main axis of the contact element.

The first and second windings can be designed differently and can be combined in any way. For example, the first and/or second windings can be triangular, house-shaped, pentagonal, hexagonal, rounded, circularly wound or wound again in themselves. In one form, windings that are wound again in themselves comprise at least one wound subsection in a top view in the circumferential direction of the contact element. For example, the curved lower section is guided through 360° in the circumferential direction of the contact element in a top view of the winding. The lower section can have a rounded and/or polygonal shape. The first and/or second windings can be symmetrical or asymmetrical. For example, the first windings protrude further radially inwards onto the main axis of the contact element than the second windings, or vice versa.

In a further form, the contact element has a conical shape. The retaining sections are arranged at an angle to a plane in which the main axis of the contact element lies. A projection of the retaining sections onto the plane in which the main axis of the contact element lies comprises an angle to the main axis. The supporting section and, if applicable, the extending section are arranged at an angle to the radius to the main axis of the contact element. By mounting the contact element in a component with a cylindrical inner wall, the first and/or second windings are deformed in such a way that the respective retaining section rests against the inner wall. The supporting sections and, if applicable, the extending sections have a larger angle to a radius on the main axis in the installed state than in the unassembled state. If a long molded part is then passed through the contact element in the assembled state in the component, the first and/or second windings are deformed depending on the diameter of the long molded part in such a way that the supporting sections and, if applicable, the extending sections have a larger angle to the radius on the main axis than in the assembled state without the long molded part.

In one form, a retaining section of the contact element rests against an inner wall of the cable gland. The inner wall is, in one form, conical or cylindrical in shape. Further in one variation, a plurality of retaining sections, in one form all retaining sections of at least the first windings, and in another form the first and second windings of the contact element, are in contact with the inner wall.

In one form the at least one contact element is accommodated in an interior of a component with at least one external thread, whereby a long molded part can be passed through the component. In one form, the cable gland comprises a nipple, for example a double nipple. The nipple is also advantageously the component that accommodates the contact element. The component, in one variation, comprises an inner wall on which the contact element is supported. The retaining section is also supported against the inner wall of the component. The inner wall of the component is, in one form, cylindrical. In one form, a vertical axis of the component, in particular of the cylindrical inner wall, extends parallel to the main axis of the installed contact element.

When the contact element is inserted into the component, the contact element is deformed. The contact element in the assembled state is inserted into the component in such a way that the retaining sections are at least partially, and in one form completely, in contact with the inner wall of the component. In one variation, the inner diameter of the component is smaller than the outer diameter of the unassembled contact element. In one form, when the contact element is mounted in the component, the contact element is at least partially compressed in the radial direction. Further, a retaining section, which in the unassembled state has an angle of approximately −50° to approximately +50° to the main axis of the through-opening of the contact element on a plane in which the main axis lies, is aligned substantially parallel to the main axis in the mounted state. In the mounted state, the first mounted diameter $d1_m$ of the through-opening without the long molded part is smaller than the first diameter d1 in the unassembled state.

In one form, in the mounted state, the first mounted diameter $d1_m$ of the through-opening without the long molded part is the same size as the first diameter d1 in the unassembled state, in particular if the outer diameter of the contact element is smaller than or equal to the inner diameter of the component. In one variation, at least the outer diameter of the contact element is widened in the assembled state by inserting the long molded part in such a way that the retaining sections make electrical contact with the inner wall of the component. Further, in the assembled state, the second assembled diameter $d2_m$ of the through-opening without the long molded part is smaller than the diameter $d2$ in the unassembled state. In the assembled state, the second assembled diameter $d2_m$ of the passage opening is the same size as the diameter $d2$ in the unassembled state.

In one form in which the first and/or second windings in the unassembled state have an orientation in the direction of the main axis in a top view of the contact element which is angular to the radius on the main axis, an orientation of the first and/or second windings can be changed when the contact element is mounted in the component. In one form, the angle of the orientation, which deviates from the radius to the main axis, increases when the contact element is mounted in a component and when a long molded part is passed through when the contact element is mounted in the component.

In one form, the at least one contact element is accommodated in an interior of a component with at least one external thread, wherein at least one long molded part can be passed through the component. The at least one long molded part is passed through the through-opening of the contact element. The first and/or the second windings contact the long molded part, in one form a stripped section of the long molded part. In a further variation, depending on the diameter of the long molded part, only the first windings, only the second windings or the first and second windings together contact the long molded part via their supporting sections.

In one form, the first and/or second windings are contacted and pressed by the long molded part in such a way that they are displaced in radial alignment to the main axis. In one variation, the first and/or second windings are contacted and pressed by the long molded part in such a way that they are displaced in a radial direction to the main axis if the outer diameter of the contact element in the assembled state without the long molded part is smaller than the inner diameter of the component. In one form, an alignment of the first and/or second windings is changed when the long molded part is passed through the through-opening of the contact element mounted in the component. If, for example, the first and/or second windings are radially aligned before the long molded part is passed through, they are displaced or deformed by passing through the long molded part in such a way that they are aligned with the main axis at an angle to the radius. If the alignments of the first and/or second windings are arranged at an angle from the radius to the main axis, for example, before the long molded part is passed through, these are changed by inserting the long molded part by displacing or deforming the windings in such a way that the angle to the radius to the main axis increases.

The long molded part within the meaning of the present disclosure comprises at least one elongate, in one form flexible, and in one variation limp, body selected from a group comprising cables, hoses and/or tubes. In one form, the long molded part is not a contact pin. Further, the long molded part is designed to transmit power and/or data. In one form, the at least one long molded part is capable of passing through the contact element. In another form, the at least one long molded part can be passed through the contact element mounted in the component. In one variation, the long molded part has an electromagnetic shield, which is stripped in the area of a cable gland.

In one form, the long molded part has a long molded part diameter that is greater than or equal to a first mounted diameter $d1_m$ of the contact element mounted in the component without the long molded part. In one variation, the long molded part makes contact with the supporting section of at least the first windings.

In one form, the long molded part has a long molded part diameter that is greater than or equal to a second mounted diameter $d2_m$ of the contact element mounted in the component without the long molded part. In one form, the long molded part contacts the supporting section of the first and second windings.

In one form a cable gland comprises a component in which the contact element can be accommodated. The cable gland also has a sealing ring for sealing to a connection geometry, a pressure element for sealing a long molded part and a pressure screw for pressing the pressure element. In one variation a design of the contact element in an unassembled state has first windings, between which two second windings are arranged. The first windings and the second windings are each radially aligned, with a bisector of the legs of the supporting sections of the first and second windings corresponding to the radius of the contact element or aligned with the contact element, although other alignments are also possible. If the contact element is mounted in the component, the contact element is radially compressed by the mounting. This compression causes the first windings to come into contact with each other and deform in the circumferential direction of the contact element. The orientation of the first windings thus changes by the angle $\beta 1$ to the radius of the contact element. The orientation of the second windings remains radial, but other orientations are also possible.

In one form the design of the component with the contact element, a long molded part with a small diameter is passed through the component or the contact element, whereby the long molded part with the small diameter only contacts the first windings and is deformed in the circumferential direction. As a result, the first windings are aligned with the radius of the contact element by an angle $\beta 2$ that is greater than the angle $\beta 1$. The second windings remain radially aligned, but other alignments are also possible. If, on the other hand, a long molded part with a large diameter is passed through the component and the contact element, in which the long molded part contacts the first windings and the second windings and deforms them in the circumferential direction, the first windings are aligned to the radius of the contact element by an angle $\beta 3$ that is greater than the angle $\beta 2$. The second windings are aligned to the radius by an angle $\gamma$ that is greater than 0°.

The contact element is used for contacting components with a shielding function and/or current-carrying function. In one form, the contact element is used for installation in a component with a rotationally symmetrical inner wall. In one form, the contact element is used for installation in a component with a cylindrical and/or conical inner wall. Alternatively, the inner wall can also be toroidal or double-conical or have a different rotationally symmetrical design. In one form, the contact element is used in a cable gland. In one form, the contact element is used to electrically connect a shield of a long molded part to a component of a cable gland.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
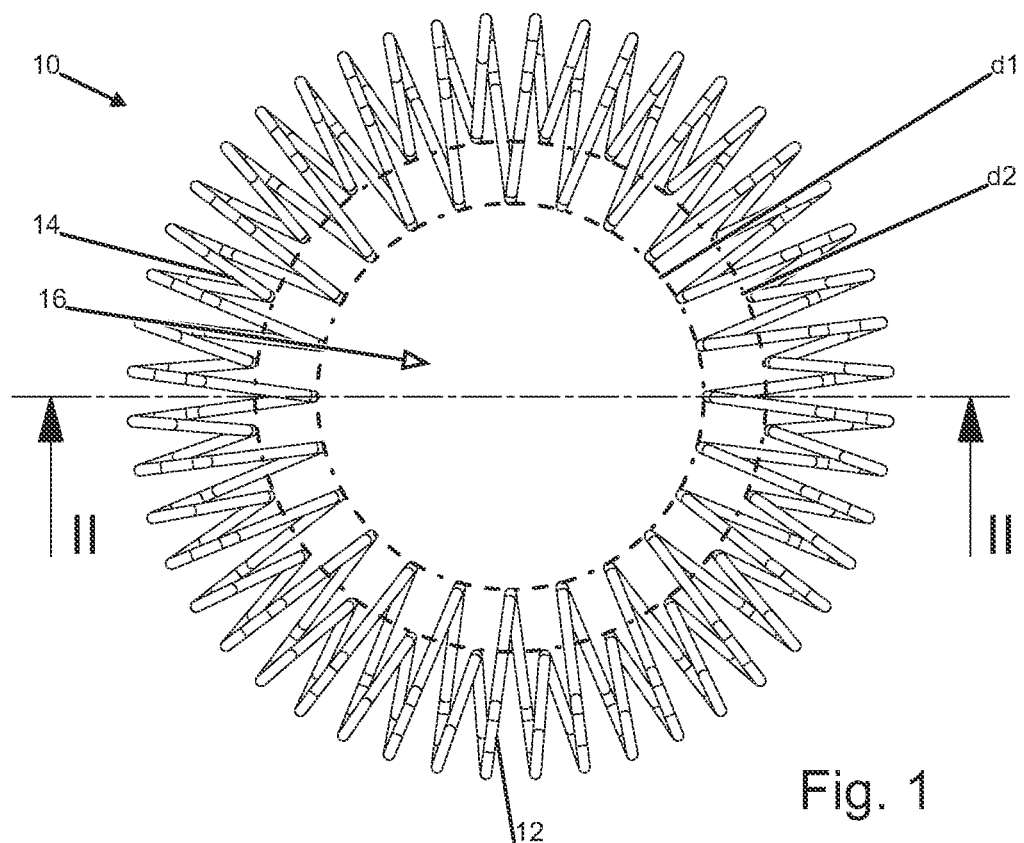
FIG. 1 shows a front view of a contact element in an unassembled state according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Further, the features described herein can be combined with one another and with the features described above to form further forms. Furthermore, it should be noted that the reference signs given in the description of the figures do not limit the scope of protection of the present disclosure, but merely refer to the forms shown in the figures.

FIG. 1 shows a contact element 10 in an unassembled state. The contact element 10 has a plurality of first windings 12 and a plurality of second windings 14, only one of which is designated by way of example. The contact element 10 is designed toroidally as an annular spring, which is shaped as a self-contained, coiled spring. Any joint is not shown. The first windings 12 differ from the second windings 14 and project radially inwards to different extents. The first and second windings 12, 14 define a through-opening 16. In the view plane of FIG. 1, the first and second windings are substantially radially aligned with a main axis 24 shown in FIG. 2. The through-opening 16 comprises a first diameter d1, which is defined by the first windings 12. Furthermore, the through-opening 16 comprises a second diameter d2 defined by the second windings 14. The first diameter d1 is smaller than the second diameter d2.

Figure 2:
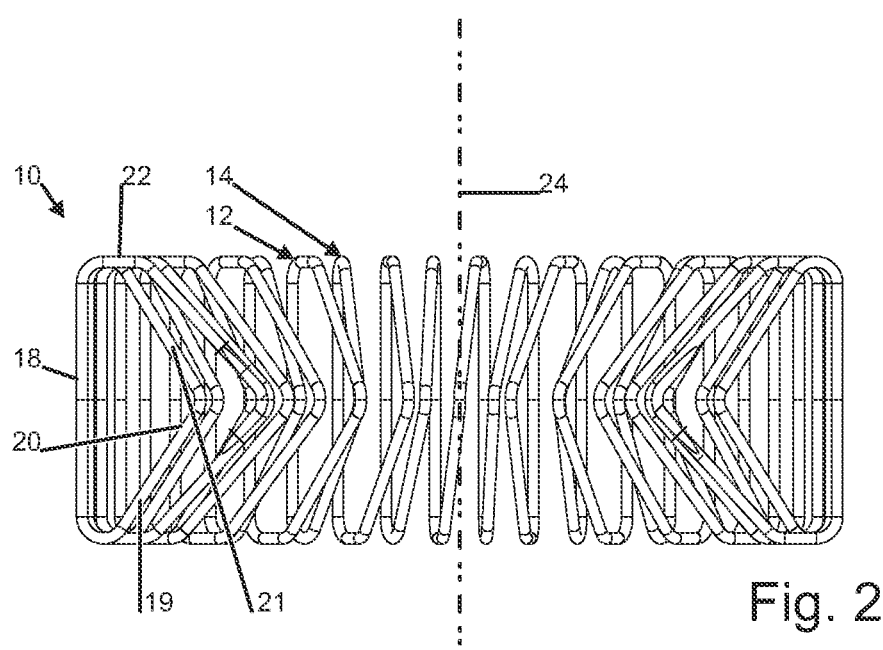
FIG. 2 shows a cross-sectional view, taken along line II-II, of the contact element from FIG. 1 in the unassembled state.

FIG. 2 shows a cross-sectional view, taken along line II-II of FIG. 1. The first and second windings 12, 14 have a retaining section 18 which can be brought into contact with an inner wall of a component not shown. The retaining section 18 is aligned parallel to a main axis 24 of the contact element 10. However, as can be seen from the above description, the retaining section 18 can also be arranged at an angle to the main axis 24. Furthermore, the first and second windings 12, 14 each comprise a supporting section 20 which can be brought into contact with a long molded part not shown. The supporting section 20 is designed as an angularly shaped section with two legs 19, 21. The first windings 12 also have an extending section 22, which is arranged between the retaining section 18 and the supporting section 20. The second windings 14 are designed in such a way that the supporting section 20 is directly adjacent to the retaining section.

Figure 3:
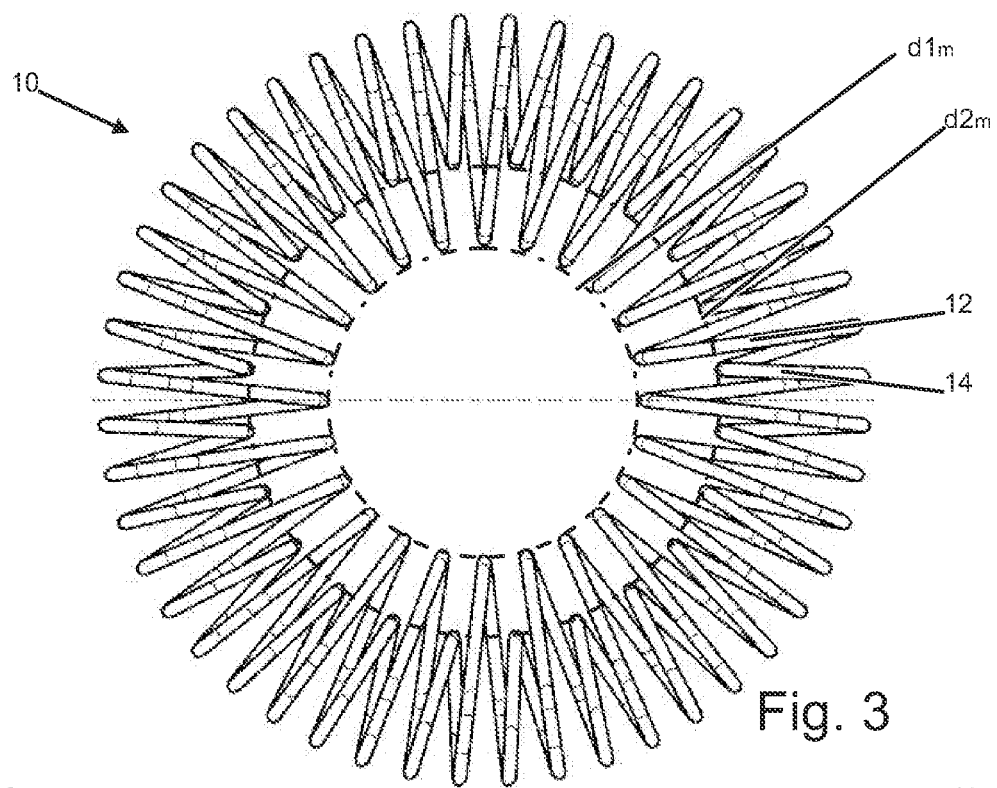
FIG. 3 shows a front view of the contact element from FIG. 1 in an assembled state according to one form of the present disclosure.

FIG. 3 shows the contact element 10 from FIG. 1 in a state assembled in a component not shown. The contact element is radially compressed by mounting the contact element in the component. The first windings 12 have a first assembled diameter $d1_m$. The second windings 14 have a second assembled diameter $d2_m$.

Figure 4:
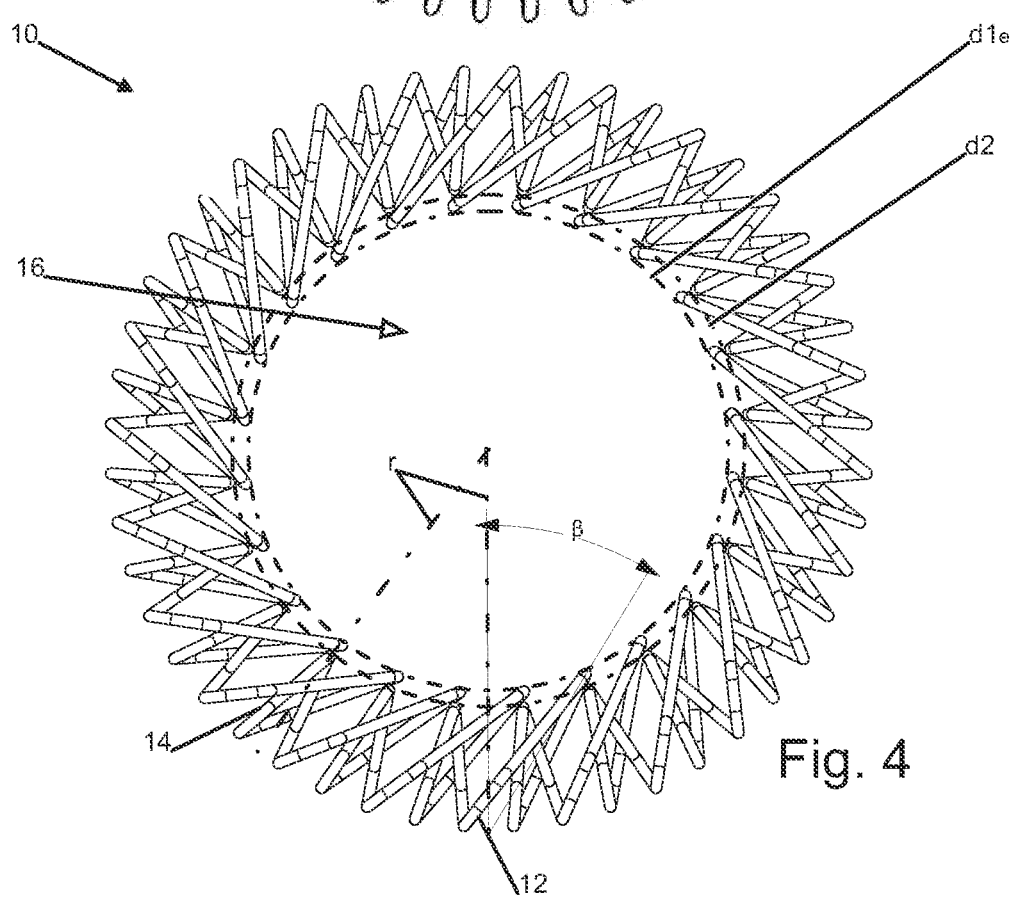
FIG. 4 shows a front view of the contact element shown in FIG. 1 in an assembled state with the long-molded part passed through according to one form of the present disclosure.

To clarify the mode of operation, FIG. 4 shows the contact element 10 in a state assembled in a component not shown, in which a long molded part, not shown for the sake of clarity, is passed through the through-opening 16. The long molded part has a long molded part diameter which is larger than the first assembled diameter $d1_m$ of FIG. 3, but smaller than the second diameter $d2_m$ of FIG. 3. The first windings 12 are at least deformed by this and form a first assembled diameter $d1_e$ which is the same size as the long molded part diameter. The first windings 12 are deformed by the passage of the long molded part in a circumferential direction of the contact element 10, so that these have an angle β to the radius r in the view plane that deviates from the radius r shown in FIG. 1, the apex of which is arranged on an outer envelope of the contact element 10 and are aligned counterclockwise in the view plane. The second windings 14 are radially aligned as in FIG. 1 in the unassembled state, as the long molded part does not touch them. Radial displacement of the first windings 12 or radial expansion of the contact element 10 is inhibited by the component, not shown, into which the contact element 10 is assembled.

Figure 5:
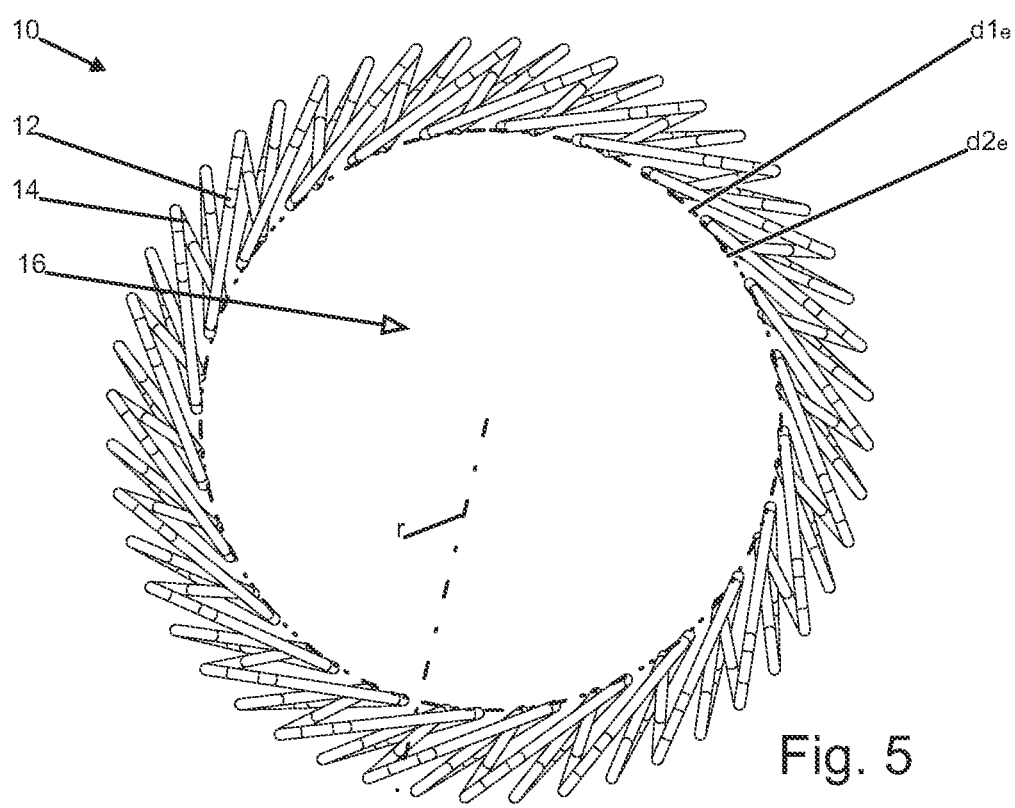
FIG. 5 shows a front view of the contact element from FIG. 1 in an assembled state with the long molded part having a larger diameter than in FIG. 4 according to one form of the present disclosure.

FIG. 5 shows the contact element 10 in a state assembled in a component not shown, in which a long molded part, not shown for the sake of clarity, is passed through the through-opening 16. The long molded part has a long molded part diameter that is larger than the first assembled diameter $d1_m$ and larger than the second assembled diameter $d2_m$ of FIG. 3. The first windings 12 and the second windings 14 are thereby deformed and form a first assembled diameter $d1_e$ and a second assembled diameter $d2_e$, which are the same size as the long molded part diameter, in one form in a stripped region of the long molded part. The first and second windings 12, 14 are deformed in a circumferential direction of the contact element 10 by the passage of the long molded part, so that in the view plane they have an angle to the radius r on the main axis 24 of the contact element 10, which is not shown here, the apex of which is arranged on the circumference of the contact element 10 and are aligned counter-clockwise in the view plane. A radial displacement of the first windings or a radial expansion of the contact element is inhibited by the component, not shown, in which the contact element 10 is assembled.

Figure 6:
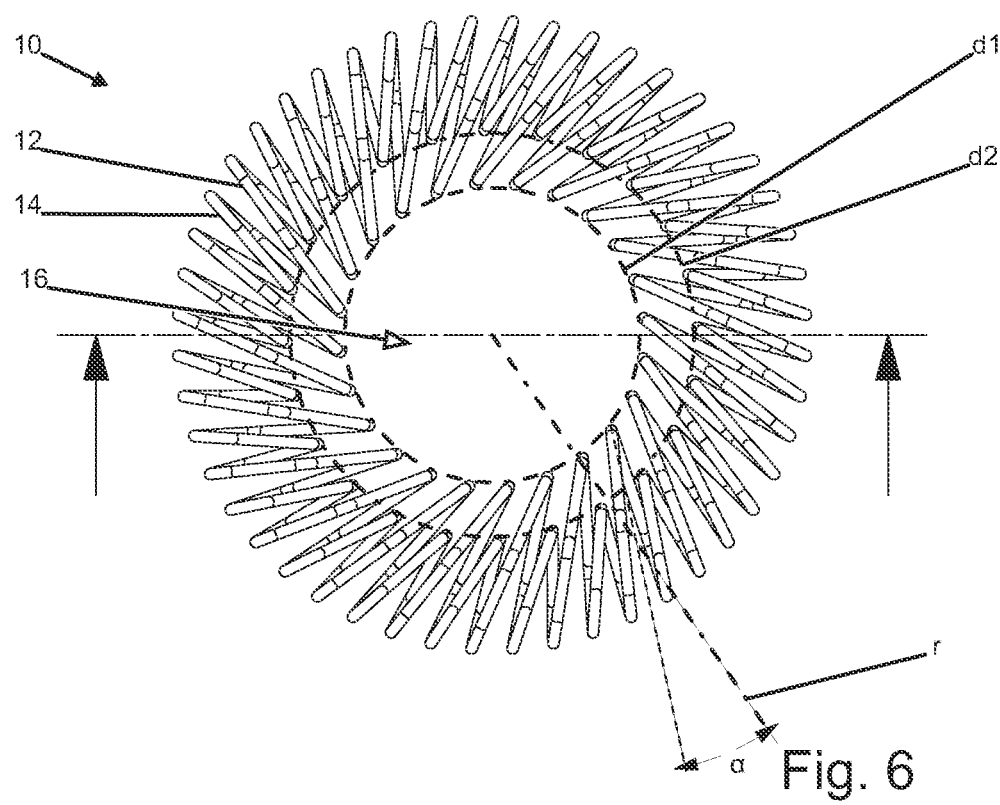
FIG. 6 shows a front view of a contact element of an alternative configuration in an unassembled state according to one form of the present disclosure.

FIG. 6 shows an alternative design of the contact element 10 in an unassembled state. The first and second windings 12, 14 are aligned at an angle α of approximately 15° to approximately 20° to the radius r of the contact element 10. The first windings 12 define a first diameter d1 and the second windings 14 define a second diameter d2 of the through-opening 16.

Figure 7:
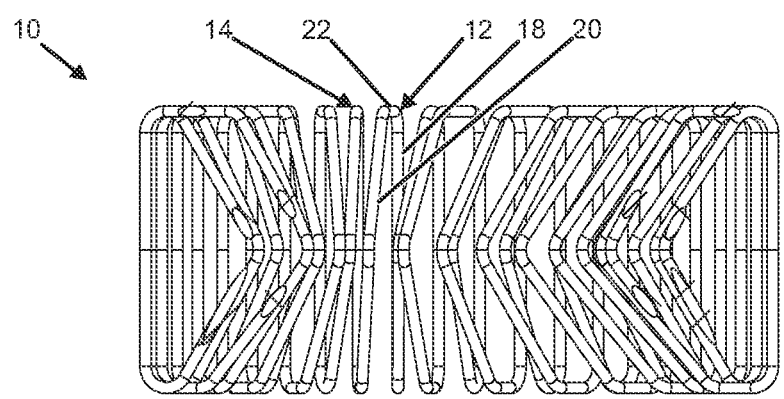
FIG. 7 shows a cross-sectional view, taken along line VI-VI, of the contact element from FIG. 5.

FIG. 7 shows a cross-sectional view, taken along line VI-VI of FIG. 6. The first and second windings 12, 14 have a retaining section 18 which can be brought into contact with an inner wall of a component not shown. The retaining section 18 is aligned parallel to a main axis 24 of the contact element 10. Further-more, the first and second windings 12, 14 each comprise a supporting section 20, which can be brought into contact with a long molded part not shown. The supporting section 20 is designed as an angularly shaped section with two legs 19, 21. The first windings 12 also have an extending section 22, which is arranged between the retaining section 18 and the supporting section 20. The second windings 14 are designed in such a way that the supporting section 20 is directly adjacent to the retaining section.

Figure 8:
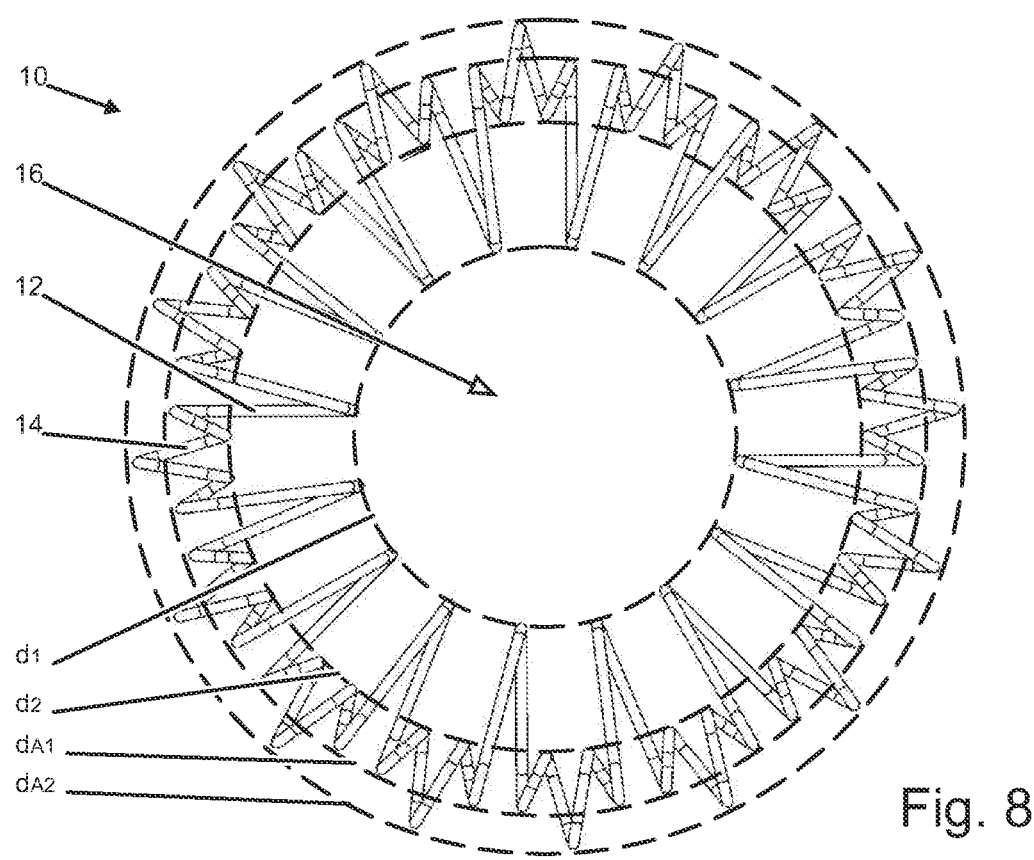
FIG. 8 shows a front view of a contact element of an alternative configuration with triangularly shaped first windings and rectangularly shaped second windings according to one form of the present disclosure.

FIG. 8 shows an alternative form of the contact element 10 in an unassembled state with triangular-shaped first windings 12 and rectangular-shaped second windings 14. The first windings 12 define a first diameter d1 of the through-opening 16 and a first outer diameter $d_{A1}$ of the contact element 10. The second windings 14 define a second diameter $d_2$ of the through-opening 16 and a second outer diameter $d_{A2}$ of the contact element 10.

Figure 9:
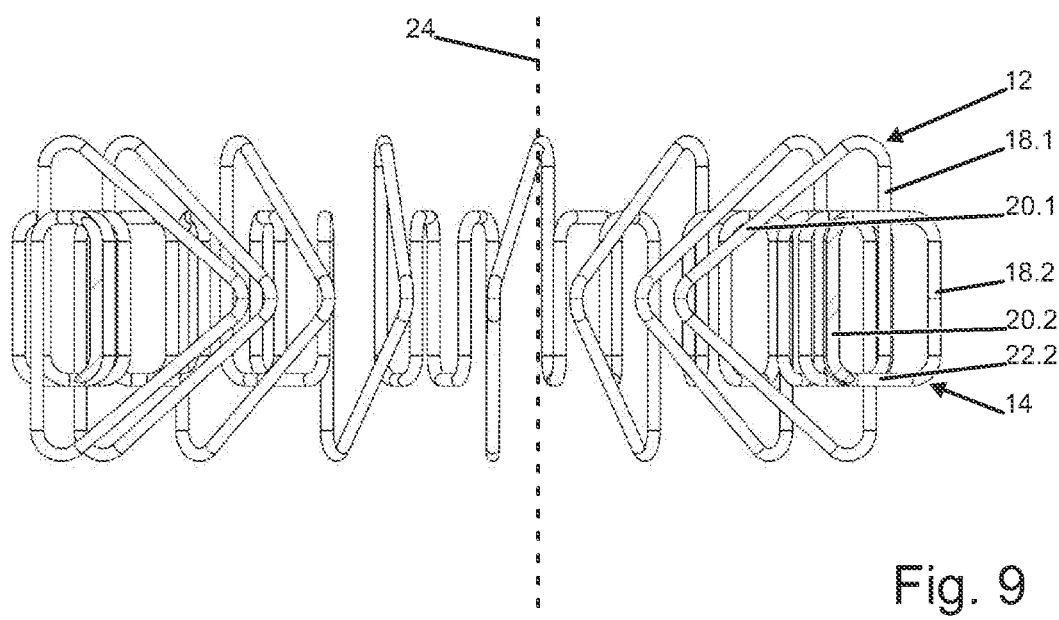
FIG. 9 shows a cross-sectional view from FIG. 8.

FIG. 9 shows a cross-sectional view from FIG. 8. The first windings 12 are triangular in shape, with the retaining section 18.1 and the supporting section 20.1 forming an approximately isosceles triangle in a view in the circumferential direction, which can also be formed at an obtuse angle. Supporting section 20.2, extending section 22.2 and retaining section. 18.2 of the second windings 14 form a rectangle when viewed in the circumferential direction, whereby the retaining section 18.2 of the second windings 14 is arranged further outwards radially to the main axis 24 than the retaining section 18.1 of the first windings 12.

Figure 10:
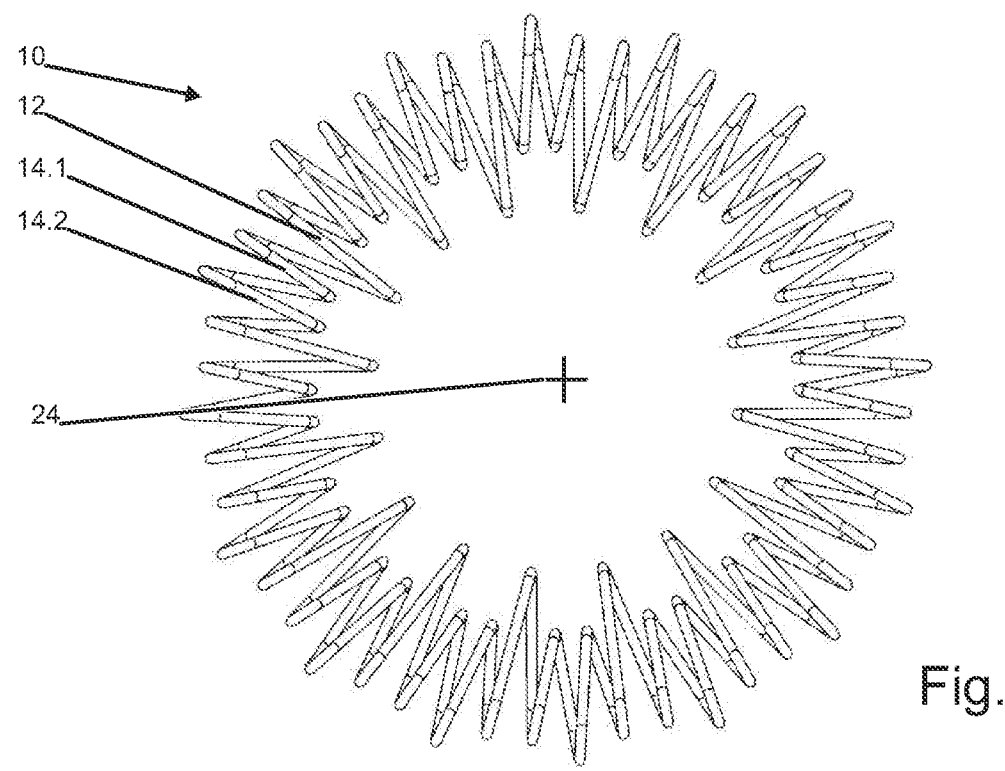
FIG. 10 shows a front view of a contact element of an alternative configuration with triangularly shaped first windings and triangularly shaped second windings according to one form of the present disclosure.

FIG. 10 shows an alternative design of the contact element 10 with triangularly shaped first windings 12 and triangularly shaped second windings 14.1 and 14.2. First windings 12, second windings 14.1 and second windings 14.2 are arranged one after the other in the circumferential direction. The second windings 14.2 project radially further outwards towards the main axis 24 than the first windings 12 and the second windings 14.1.

Figure 11:
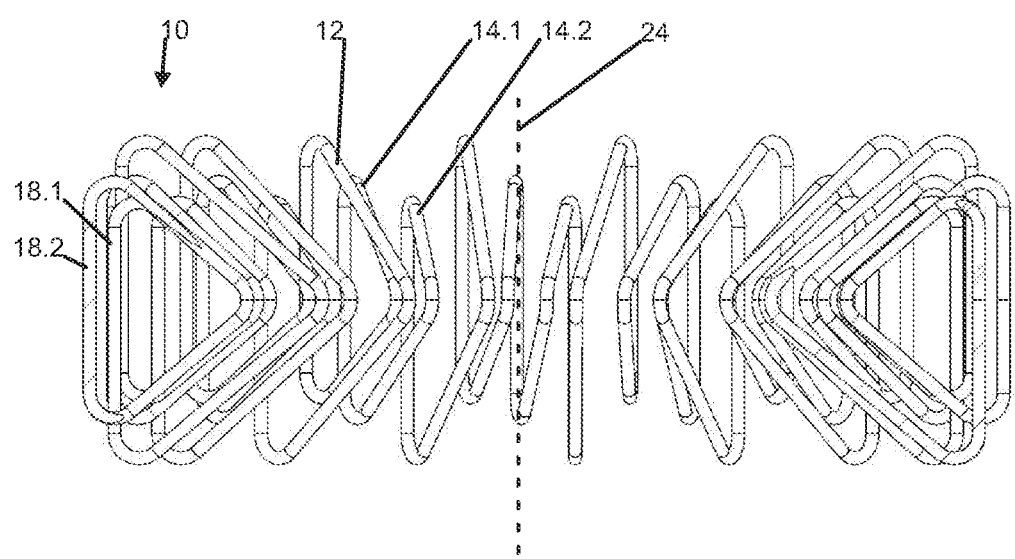
FIG. 11 shows a cross-sectional view from FIG. 10.

FIG. 11 shows a cross-sectional view from FIG. 10, from which the sequence of the first windings 12, second windings 14.1 and second windings 14.2 can be seen The retaining section 18.2 of the second windings 14.2 is arranged further radially outwards in relation to the main axis 24 than the retaining section 18.1 of the second windings 14.1.

Figure 12:
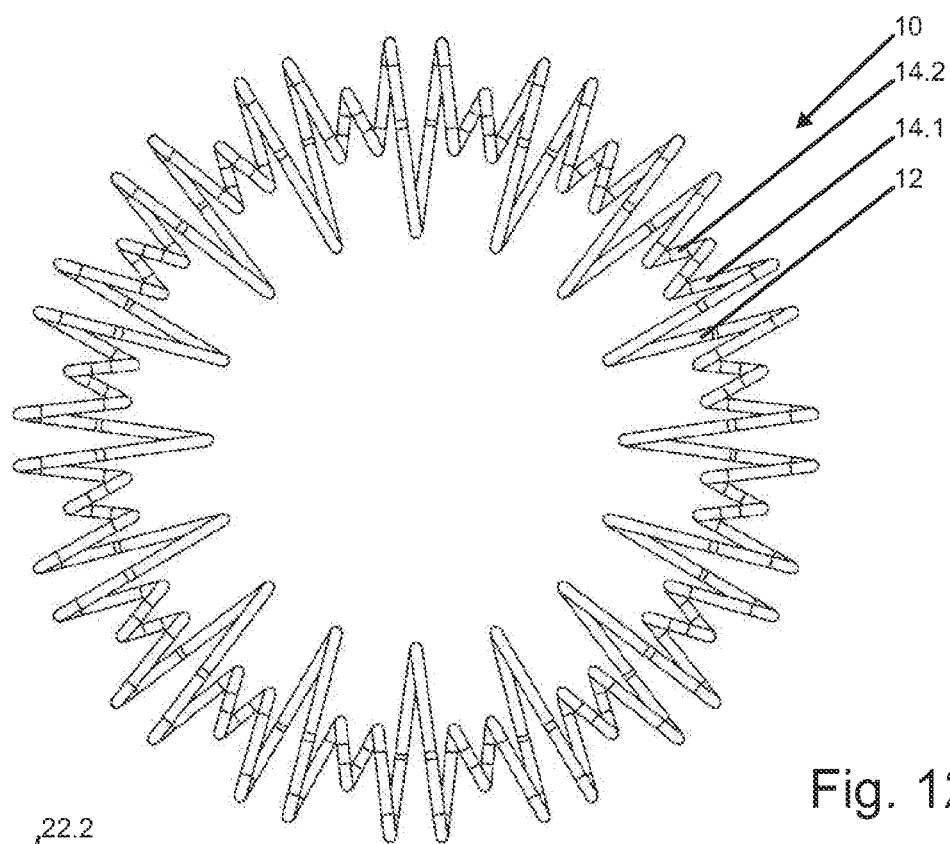
FIG. 12 show a front view of a contact element of an alternative configuration with double-wound second windings according to one form of the present disclosure.

FIG. 12 shows an alternative form of the contact element with first windings 12 and two forms of second windings 14.1 and 14.2.

Figure 13:
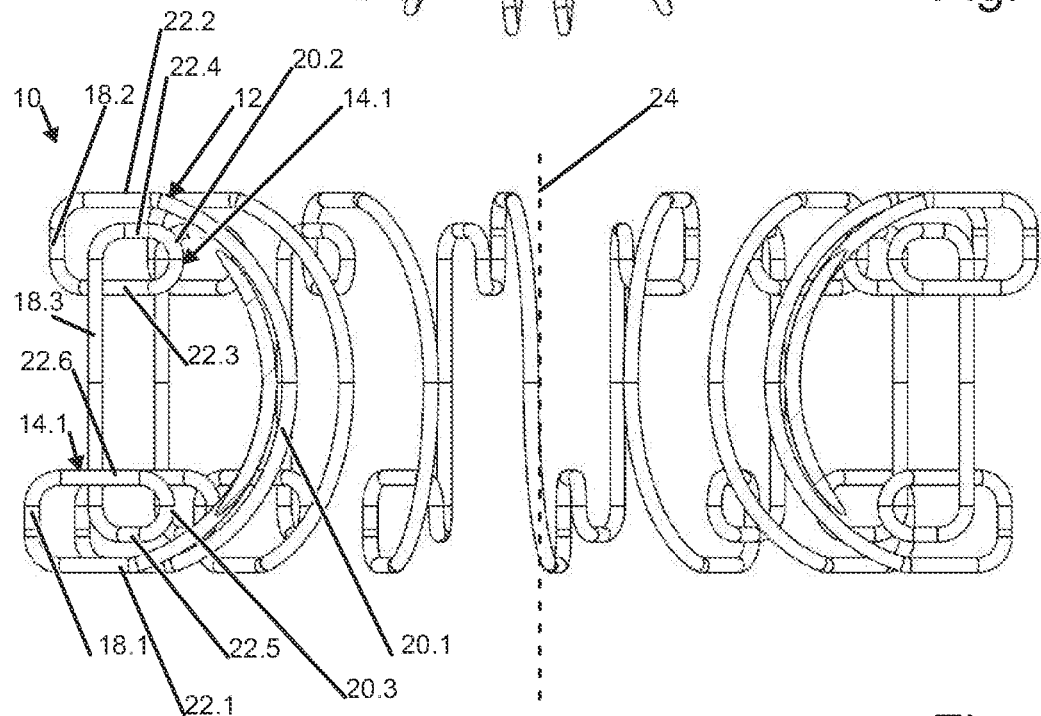
FIG. 13 shows a cross-sectional view of FIG. 12.

FIG. 13 shows a cross-sectional view of FIG. 12. The first windings 12 have a curved supporting section 20.1, two extending sections 22.1 and 22.1 and a retaining section 18.1. The contact element 10 comprises two configurations of second windings 14.1 and 14.2. The first configuration 14.1 of the second windings comprises a retaining section 18.2, two extending sections 22.3 and 22.4 and a supporting section 20.2. The immediately following second configuration 14.2 of the second winding comprises a retaining section 18.3, two extending sections 22.5 and 22.6 and a supporting section 20.3. The retaining section 18.3 of the second configuration 14.2 of the second windings is arranged closer to the main axis 24 than the retaining sections 18.1 and 18.2 of the first windings 12 and the first configuration 14.1 of the second windings. As such, the configuration allows for a section of the inner wall of a component, not shown here, into which the contact element 10 can be mounted, to be engaged between the retaining sections 18.1 and 18.2. The component can, for example, be manufactured in such a way that a bore has a first and a second inner diameter which is suitable for the abutment of the retaining sections 18.1 and 18.2 of the first windings 12 and the first configuration 14.1 of the second windings, wherein a smaller third inner diameter is arranged between the first and the second inner diameter, which forms the section of the component and which is designed for the abutment of the retaining section 18.3.

Figure 14:
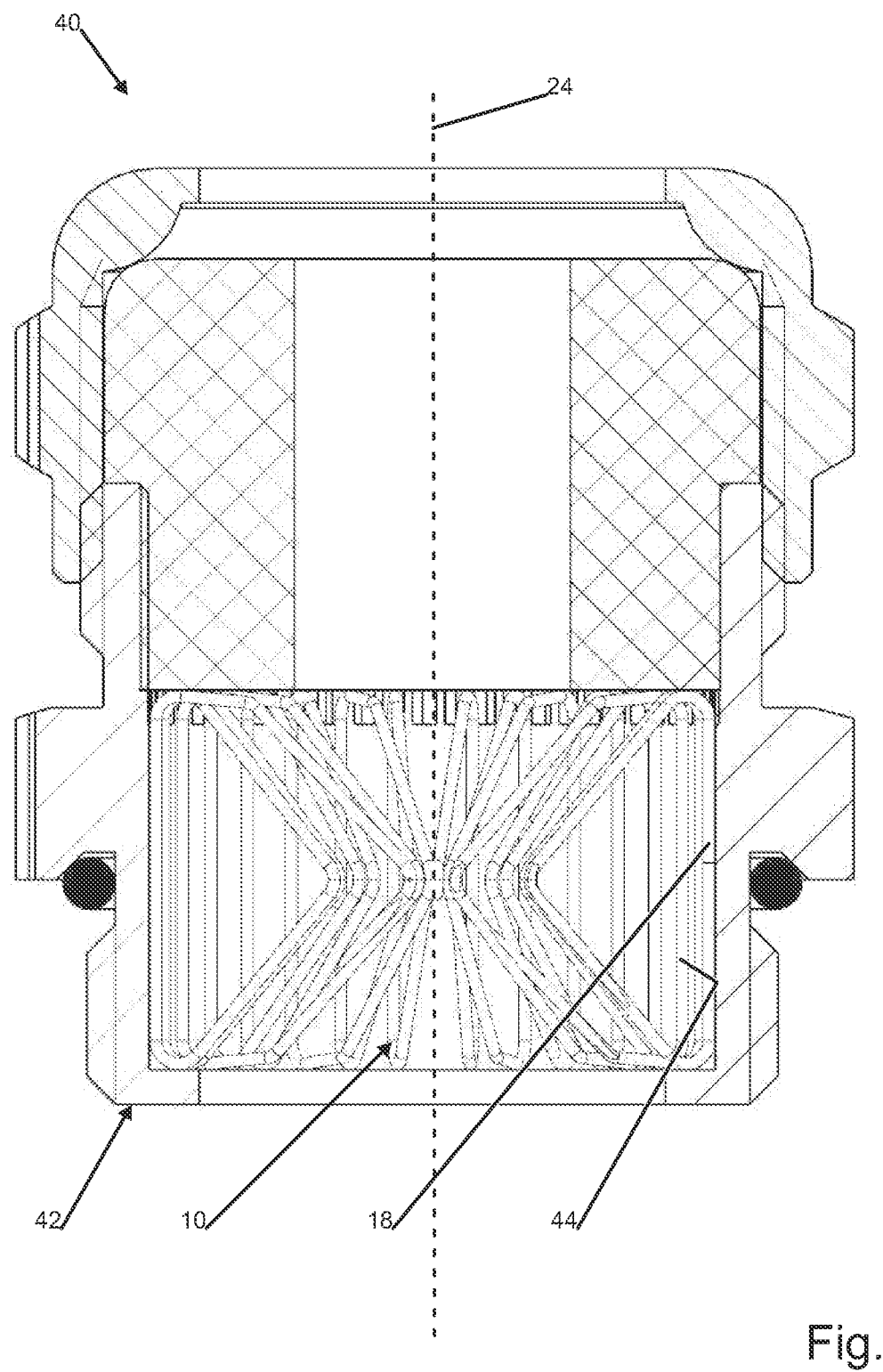
FIG. 14 shows a longitudinal cross-section through a cable gland according to one form of the present disclosure.

FIG. 14 shows a longitudinal cross-section through a cable gland 40. The cable gland 40 has a component 42 in which a contact element 10 is assembled. During assembly, the contact element 10 is compressed in the radial direction towards the main axis 24 so that the contact element 10 can rest with the retaining sections 18 against an inner wall 44 of the component 42.

Figure 15:
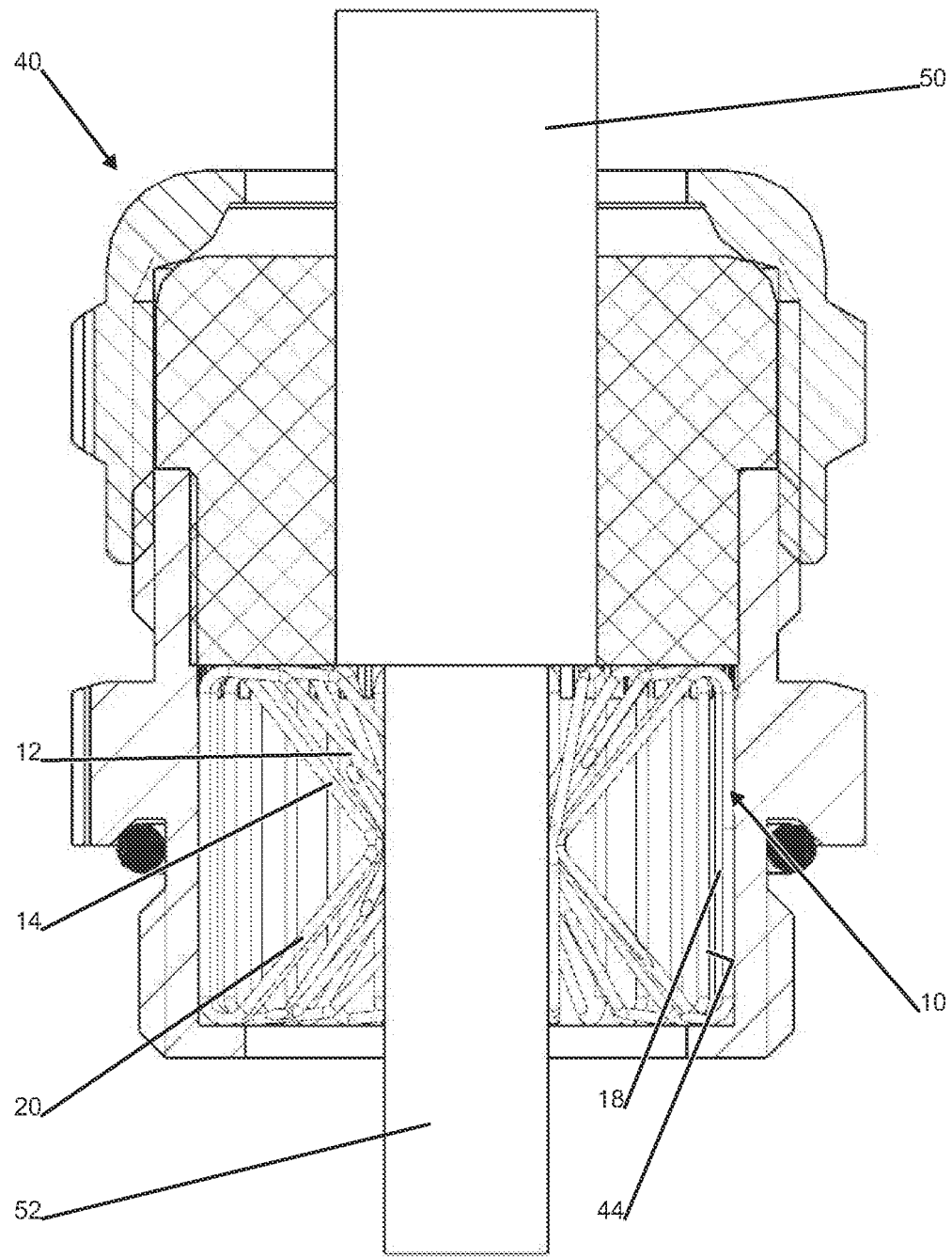
FIG. 15 shows a longitudinal cross-section through the cable gland of FIG. 14 with the long molded part passed through according to one form of the present disclosure.

FIG. 15 shows a longitudinal cross-section through the cable gland of FIG. 14 with the long molded part 50 passed through. The long molded part 50 has a stripped section 52 which contacts the supporting section 20 of the contact element 10. As already described above, the windings 12, 14 contacted by the long molded part 50 in the area of the stripped section 52 are deformed, whereby radial expansion is inhibited as the retaining sections 18 are held by the inner wall 44.

Figure 16:
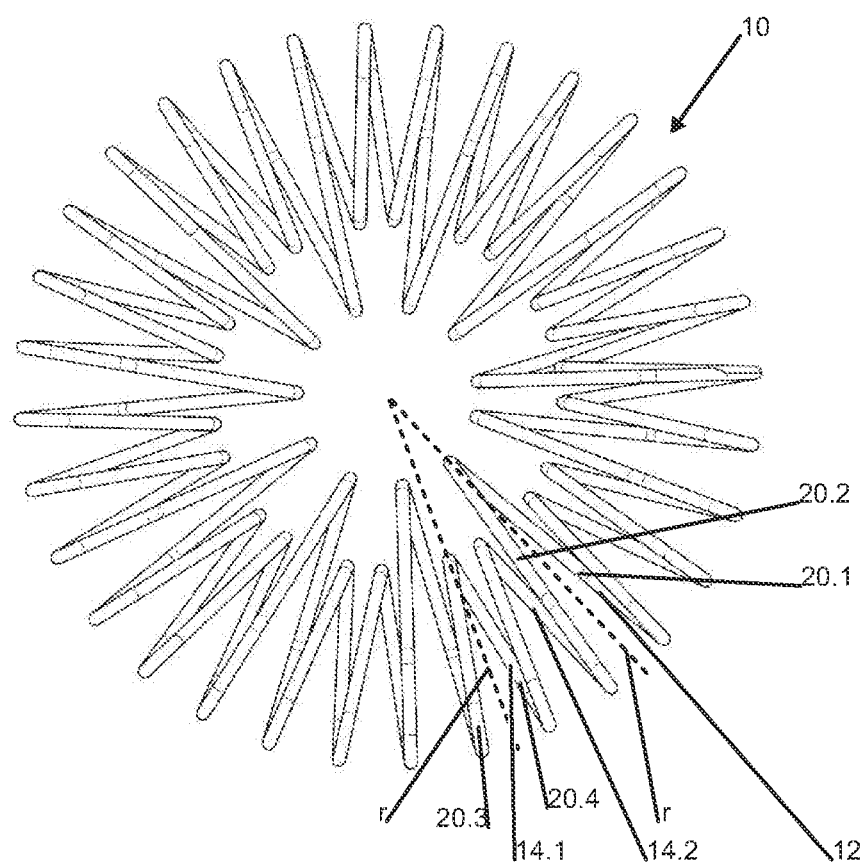
FIG. 16 shows a front view of a contact element of an alternative configuration in an unassembled state according to one form of the present disclosure.

FIG. 16 shows an alternative design of the contact element 10 in an unassembled state. The contact element has first windings 12, between which two second windings 14.1 and 14.2 are arranged. The first windings 12 and, for example, the second winding 14.1 are each radially aligned, with a bisector of the legs of the supporting sections 20.1 and 20.2 or 20.3 and 20.4 corresponding to the radius r of the contact element 10.

Figure 17:
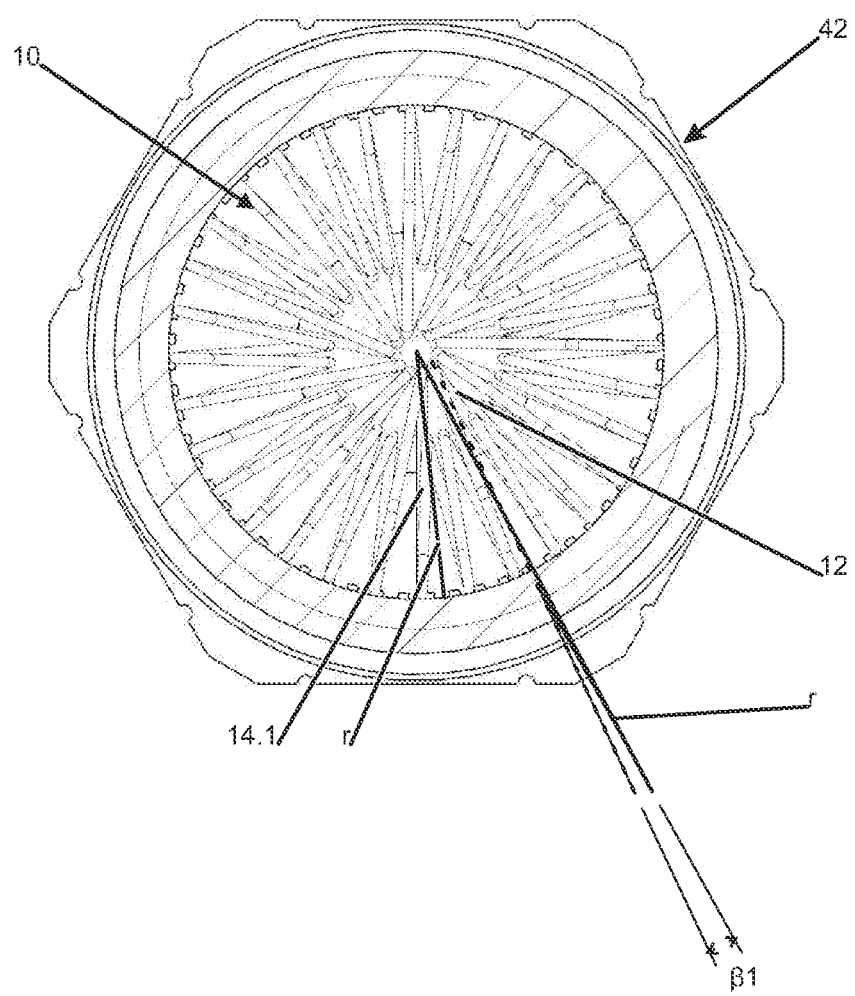
FIG. 17 shows a front view of the contact element from FIG. 16 assembled in a component according to one form of the present disclosure.

FIG. 17 shows the contact element 10 from FIG. 16 assembled in a component 42. The contact element 10 is radially compressed by the assembly. The compression causes the first windings 12 to come into contact with each other and deform in the circumferential direction of the contact element 10. The orientation of the first windings 12 thus changes by the angle 131 to the radius r. The orientation of the second windings 14.1 remains radial.

Figure 18:
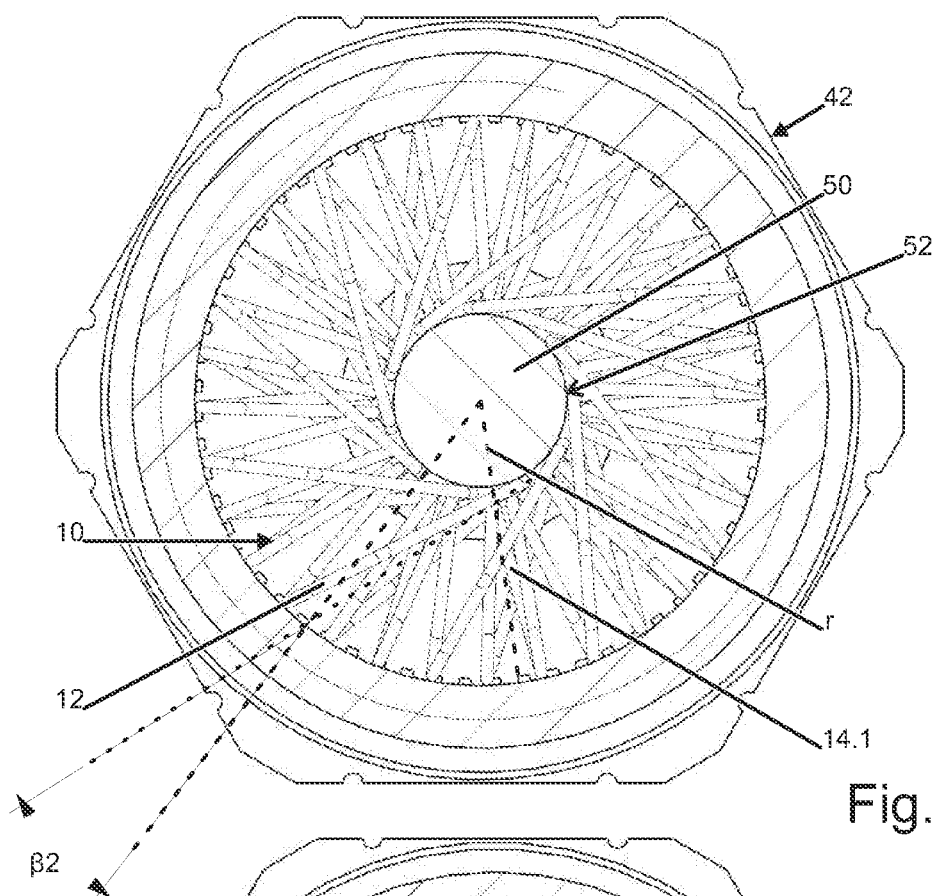
FIG. 18 shows a front view of the component from FIG. 17 with a long molded part with a small diameter according to one form of the present disclosure.

FIG. 18 shows the component from FIG. 17 with a long molded part 50 with a small diameter. For the sake of clarity, the long molded part 50 has a diameter in the stripped section 52 that is not shown, in which the stripped section 52 only contacts the first windings 12 and deforms them in the circumferential direction. As a result, the first windings 12 are aligned by an angle β2 to the radius r of the contact element 10. The second windings 14.1. remain radially aligned.

Figure 19:
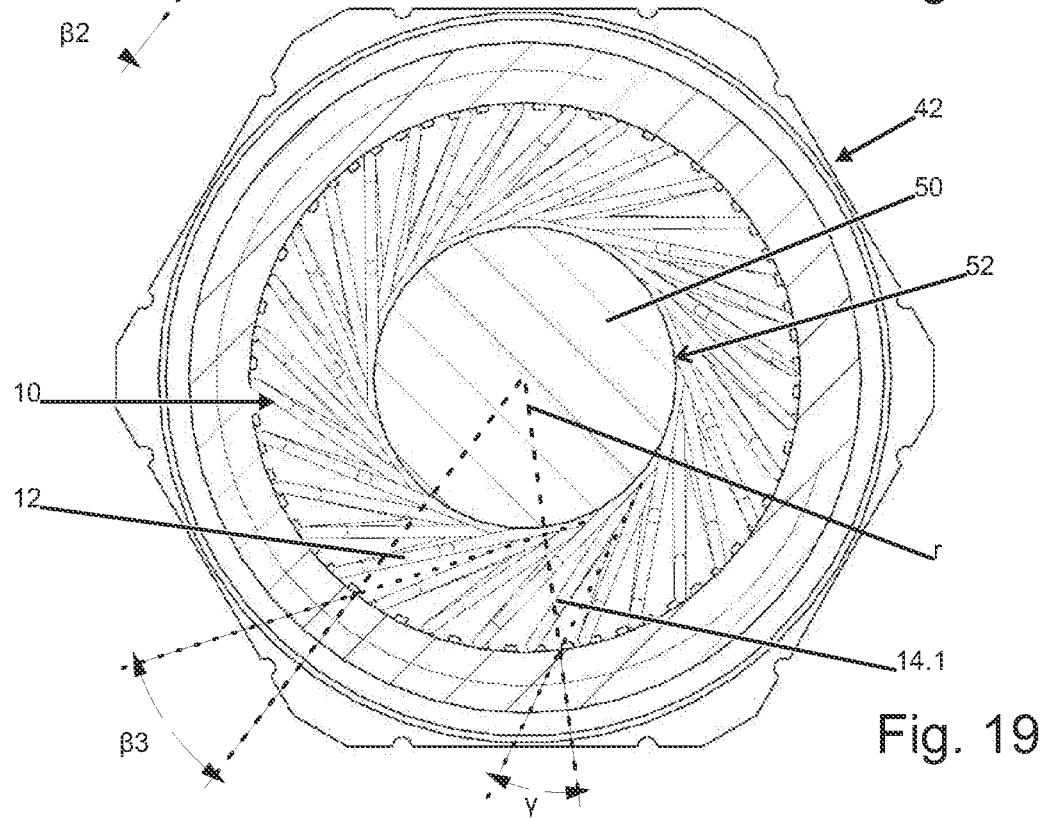
FIG. 19 shows a front view of the component from FIG. 17 with a long molded part with a large diameter according to one form of the present disclosure.

FIG. 19 shows the component from FIG. 17 with a long molded part with a large diameter. For the sake of clarity, the long molded part 50 has a diameter not shown in the insulated section 52, in which the insulated section 52 contacts the first windings 12 and the second windings 14 and deforms them in the circumferential direction. As a result, the first windings 12 are aligned by an angle β3 to the radius r of the contact element 10. The windings 14.2 are aligned by the angle γ in the direction of the radius' r.

Figure 20:
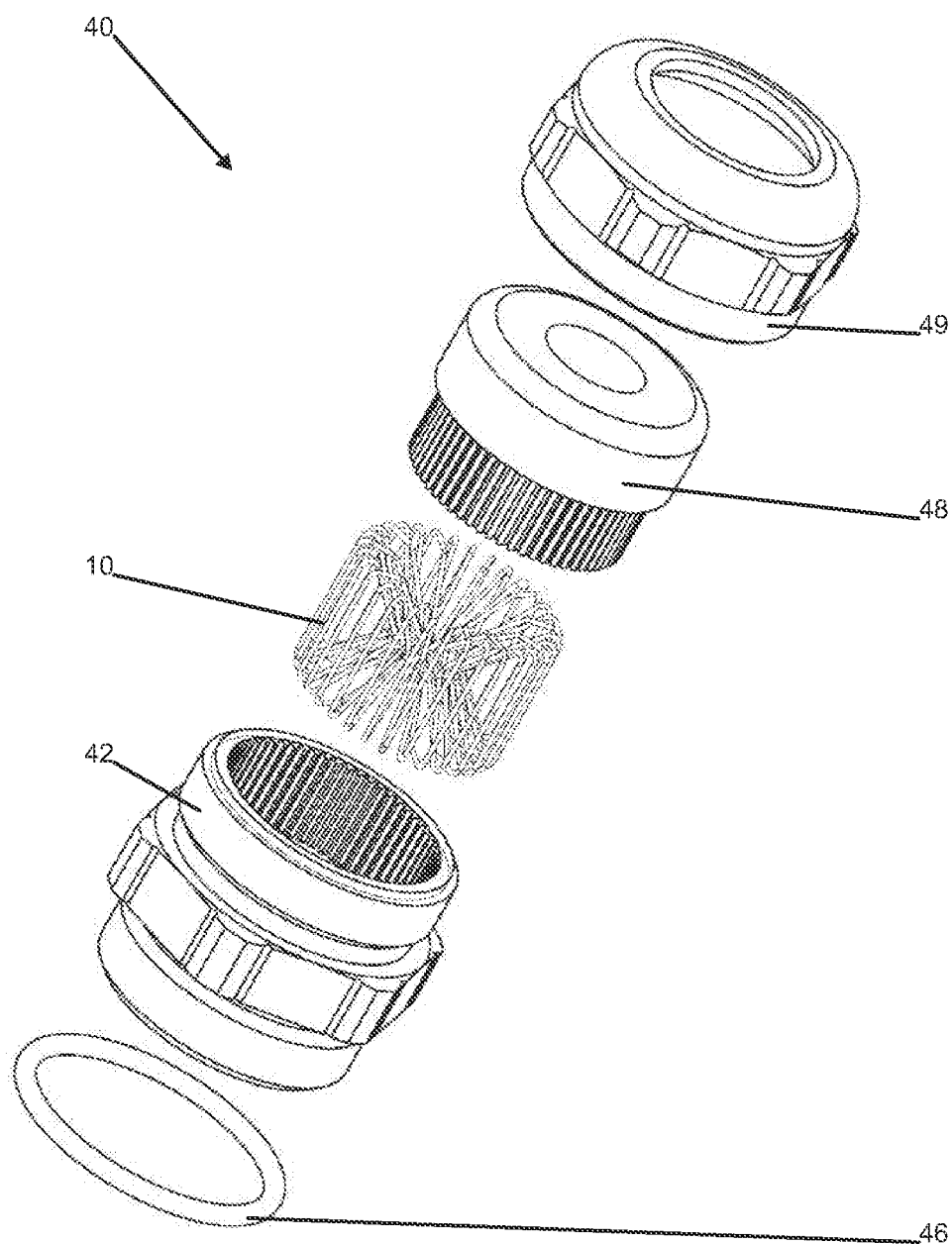
FIG. 20 shows a perspective exploded view of a cable gland according to one form of the present disclosure.

FIG. 20 shows an exploded view of a cable gland 40. The cable gland 10 comprises a component 42 in which the contact element 10 can be accommodated. The cable gland 40 also has a sealing ring 46 for sealing to a connection geometry not shown, a pressure element 48 for sealing a long molded part, not shown, and a pressure screw 49 for pressing the pressure element 48.

With the proposed contact element, various long molded parts with different diameters can be contacted securely. Replacing the contact element, for example to adapt a cable gland to different cable diameters, can be omitted with the proposed contact element. Furthermore, the contact element according to the present disclosure can also accommodate a long molded part with a smaller diameter without adversely increasing spring stiffness by reducing the number of windings contacting the long molded part.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cable gland comprising:
at least one contact element for contacting at least one long molded part, the contact element comprising:
a plurality of first windings;
a plurality of second windings which are geometrically different from the first windings; and
a through-opening for a passage of the at least one long molded part, wherein a first diameter of the through-opening is defined by the plurality of first windings and a second diameter of the through-opening is defined by the plurality of second windings, and wherein the first diameter and the second diameter are different.

2. The cable gland according to claim 1, wherein the contact element is annular in shape.

3. The cable gland according to claim 1, wherein the plurality of first windings and/or the plurality of second windings comprise at least one retaining section for contacting a component.

4. The cable gland according to claim 3, wherein the plurality of first windings and/or the plurality of second windings comprise at least one extending section which adjoins the retaining section.

5. The cable gland according to claim 3, wherein at least one of the retaining sections is of rectilinear design and has an angle in a range from about −50° to about +50° to a main axis passing through the through-opening.

6. The cable gland according to claim 3, wherein at least one of the retaining sections of the contact element abuts against an inner wall of the cable gland.

7. The cable gland according to claim 1, wherein the plurality of first windings and the plurality of second windings have a supporting section for abutment against a long molded part.

8. The cable gland according to claim 7, wherein the supporting section of the plurality of first windings and/or the plurality of second windings, in view of the first or second winding in direction of the circumference, respectively, is arcuate, rectilinear, semicircular, and/or is formed as part of a triangle with a triangular apex.

9. The cable gland according to claim 1, wherein the plurality of first windings and the plurality of second windings have identical or different basic shapes, in a view of the first or second winding in direction of the circumference, respectively.

10. The cable gland according to claim 9, wherein the basic shape of the plurality of first windings and/or the plurality of second windings, in a view of the first and second winding in direction of the circumference, respectively, is selected from a group comprising: round, ellipsoidal, triangular, quadrangular, pentagonal or polygonal, square, rectangular, trapezoidal, polygonal, and/or semicircular.

11. The cable gland according to claim 1, wherein one or more second windings are arranged between two first windings.

12. The cable gland according to claim 1, wherein the plurality of first windings and the plurality of second windings are arranged individually or alternately in groups.

13. The cable gland according to claim 1, wherein the plurality of first windings are formed with at least one extending section and define the first diameter of the through-opening and the plurality of second windings are substantially triangular, as seen in a view of the second winding in direction of the circumference, and define the second diameter of the through-opening, wherein the first diameter is smaller than the second diameter.

14. The cable gland according to claim 1, wherein the at least one contact element is accommodated in an interior of a component with at least one external thread, wherein at least one long molded part can be passed through the component.

* * * * *